United States Patent [19]

Takazawa

[11] 4,239,568
[45] Dec. 16, 1980

[54] METHOD OF MANUFACTURING A BALL

[75] Inventor: Kazuyasu Takazawa, Tokyo, Japan

[73] Assignee: Tachikara Kabushiki Kaisha, Tokyo, Japan

[21] Appl. No.: 922,754

[22] Filed: Jul. 7, 1978

[30] Foreign Application Priority Data

Feb. 2, 1978 [JP] Japan .................................. 53/10875

[51] Int. Cl.³ ...................... B32B 31/02; B29C 17/02; A63B 41/08; A63B 45/00
[52] U.S. Cl. .................................... 156/155; 156/156; 156/212; 156/242; 156/297; 249/65; 264/221; 264/224; 264/314; 264/317; 273/58 BA; 273/58 K; 273/58 R; 428/35
[58] Field of Search ............... 156/155, 156, 212, 242, 156/297; 264/221, 224, 314, 317; 273/58 BA, 58 B, 58 K, 58 R; 428/35; 249/65

[56] References Cited

U.S. PATENT DOCUMENTS

| Re. 21,901 | 9/1941 | Reach | 156/155 X |
| 1,986,629 | 1/1935 | Fenton | 264/314 X |
| 2,211,670 | 8/1940 | Reach | 156/155 X |
| 4,169,594 | 10/1979 | Crane | 273/58 BA |
| 4,187,134 | 2/1980 | Švub et al. | 156/170 |

Primary Examiner—John T. Goolkasian
Assistant Examiner—Robert A. Dawson
Attorney, Agent, or Firm—Blanchard, Flynn, Thiel, Boutell & Tanis

[57] ABSTRACT

A method of manufacturing a ball for use in volleyball or soccer includes the steps of manufacturing a spherical hollow body of a brittle material, sticking cloth strips in an overlapping manner on the spherical hollow body to provide a bag body, cutting a predetermined portion of the bag body to make an opening thereon, collapsing the spherical hollow body in the bag body into pieces, taking the collapsed pieces out of the bag body through the opening, putting a tube having a valve through the opening into the bag body, sticking rubber ribbons on places corresponding to the overlapping portions of the cloth strips, and sticking leather sheets on the rubber ribboned bag body to provide an outer layer for the ball.

4 Claims, 14 Drawing Figures

METHOD OF MANUFACTURING A BALL

BACKGROUND OF THE INVENTION

This invention relates to a method of manufacturing a ball and more particularly to a method of manufacturing a ball for use in volleyball or soccer.

It has been considered very important to provide a high production method of manufacturing such a ball as used in the game of volleyball or soccer. Considering the nature of the game, a ball must be manufactured having substantially a spherical configuration. However, such a requirement has not been met in a conventional method for the manufacture of a ball.

SUMMARY OF THE INVENTION

Accordingly, it is a main object of the present invention to provide a method of manufacturing a ball of a substantially spherical configuration.

It is another object of the present invention to provide a method of manufacturing a ball such that, when a player impacts or hits the ball, the "feel" of the ball enables the player to more accurately control the ball's movement.

It is a further object of the present invention to provide a method of manufacturing a ball wherein the ball is manufactured at high levels of productivity.

According to the present invention, there is provided a method of manufacturing a ball which comprises manufacturing a spherical hollow body of a brittle material, sticking cloth strips in an overlapping manner on the spherical hollow body to provide a bag body, cutting a predetermined portion of the bag body to make an opening thereon, collapsing the spherical hollow body in the bag body into pieces, taking the collapsed pieces out of the bag body through the opening, putting a tube having a valve through said opening into the bag body, sticking the turned up edges of the opening to the base of the tube valve, sticking rubber ribbons on places corresponding to the cloth strip-overlapping portions of the bag body, curing said rubber ribbons on the bag body, and sticking leather sheets on the bag body to provide an outer layer for the ball.

In a preferred embodiment of the present invention, the tube is coated with lubricant so that the bag is prevented from adhering to the inner surface of the bag body. This assures that a player senses a desirable "feel", when using a ball manufactured in the present invention, so as to permit control over the ball movement.

Further and more specific objects and advantages of the present invention and the manner in which it is carried into practice are more apparent in the following specification wherein, as noted above, the invention is described in detail with reference to the accompanying drawings, in which:

DETAILED DESCRIPTION OF THE PREFERRED EMBODIMENTS

Figure 1:
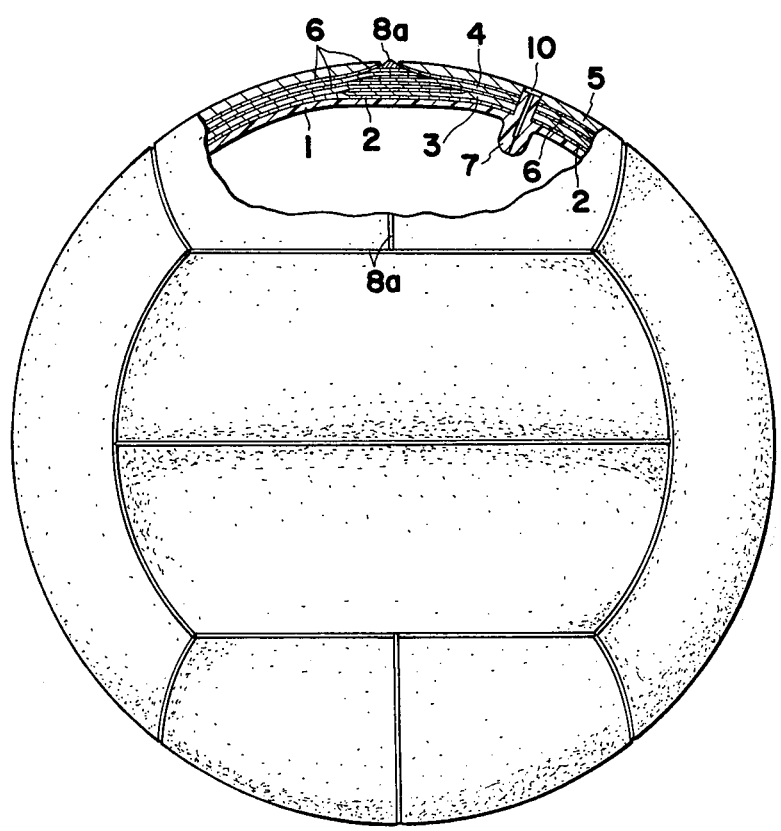
FIG. 1 is a partial sectional view illustrating a ball which is manufactured in the present invention.
Figure 2:
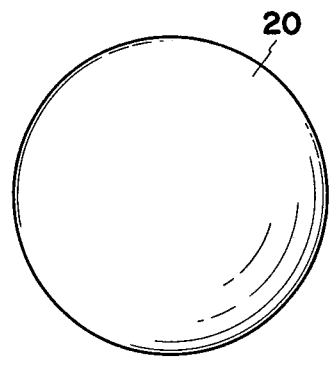
FIGS. 2 to 14 are explanatory views illustrating a ball in each step adopted in a method of manufacturing a ball according to the present invention.

In FIG. 1, there is shown a volleyball manufactured in a method of manufacturing a ball according to the present invention. The volleyball comprises a tube, or bladder, 1 having a valve 7, first and second layers of cloth strips 3 and 4, and an outer layer of leather sheets 5. In the construction of this volleyball, the tube 1 is coated with lubricant 2 such as talc to be prevented from adhering to the inner surface of the first layer of the cloth strips 3. The first and second layers of the cloth strips 3 and 4 are stuck to each other by adhesive 6 to provide a bag body. On the bag body are stuck the outer layer of the leather sheets 5 by adhesive 6 to provide the volleyball. The valve 7 of the tube 1 is positioned in an opening 10 to allow pumping-up of the tube 1. Boundaries (protrusions) 8a can be found between leather sheets 5 and they may be formed on vulcanized rubber ribbons 8 (hereinafter explained in detail).

With reference to FIGS. 2 to 14, there are shown steps of manufacturing a volleyball in a method of manufacturing a ball according to the present invention.

First of all, a spherical hollow body 20 is manufactured of a brittle material such as paraffin (FIG. 2), this being well known in the art. It is desirable that this spherical hollow body 20 has the highest accuracy of a spherical configuration for the reason that it is the primary configuration for a ball to be manufactured in the present invention.

Figure 3:
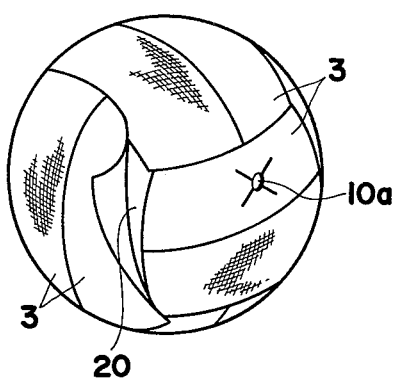
Figure 4:
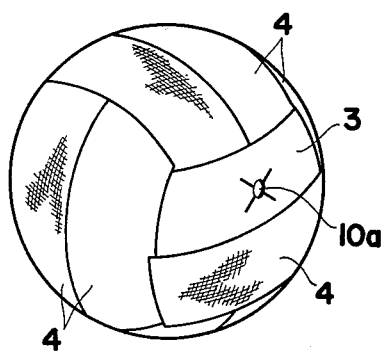
Figure 5:
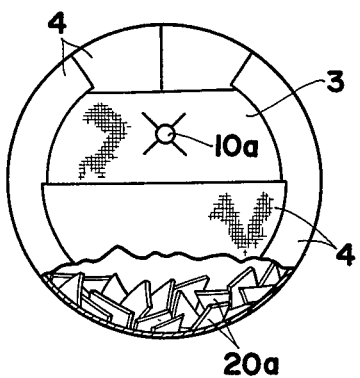

Next, twelve cloth strips 3 are stuck, or adhered, the spherical hollow body 20 to provide a first layer thereof in such a manner that the cloth strips overlap, and hence are stuck together, at the margin thereof. One of the cloth strips has marked thereon a position, for instance by a pencil, at which an opening is made as shown by 10a (FIG. 3). Further, eleven cloth strips 4 are additionally stuck on the former eleven cloth strips 3 other than the marked cloth strip. As a result, there are provided a single cloth portion and twofold cloth portions on the spherical hollow body 20. Each of the cloth strips 3 and 4 is approximately shaped as a four-sided polygon as seen in FIGS. 3 and 4 and is preferably sufficiently elastic as to allow the adherence thereof around the curved surface of the spherical hollow body 20. The twofold portions of the cloth strips 3 and 4 are integrally stuck to each other thereby resulting in high mechanical strength, especially a large resistance to tearing-up, as necessary for a ball in a practical use. Now, a material of adhesive 6 must be selected from materials which do not adhere to the spherical hollow body 20, but work effectively for cloth or leather. This allows the collapsed pieces of the spherical hollow body 20 to be easily removed from the bag body through an opening therein.

The spherical hollow body 20 of a brittle material is collapsed into pieces 20a in the bag body of the first and second cloth strip layers 3 and 4. Even in this collapse of the spherical hollow body 20, the bag body may be is kept in substantially the original configuration thereof due to the construction in which the first and second layers of the cloth strips 3 and 4 are firmly stuck to each other (FIG. 5), although this is not essential.

Figure 6:
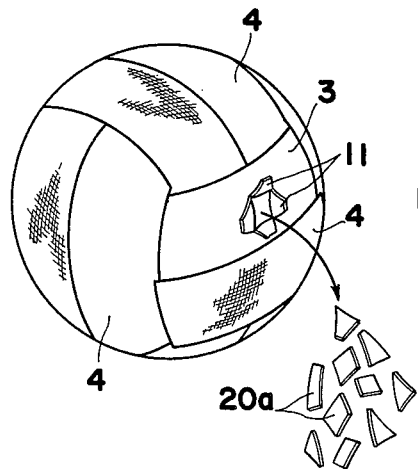

Thereafter, the single cloth portion is cut at the marked position 10a by means of, for instance, scissors to make an opening through which the collapsed pieces 20a are removed from the bag body. Reference numeral 11 indicates the turned-up edges of the cut portion for the opening (FIG. 6).

Figure 7:
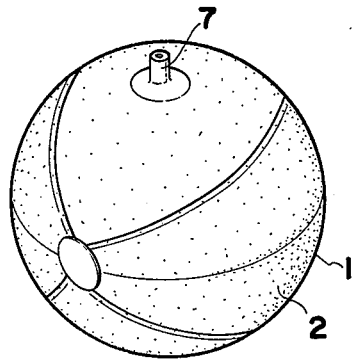

FIG. 7 shows a tube 1 having a valve 7 and which is capable of being pumped up to be made round and coated with lubricant 2 such as powdery talc.

Figure 8:
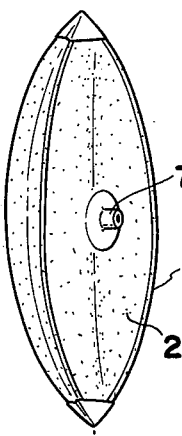

The tube 1 is folded along lines 1a so as to be made small to facilitate the putting thereof through the opening into the bag body (FIG. 8).

Figure 9:
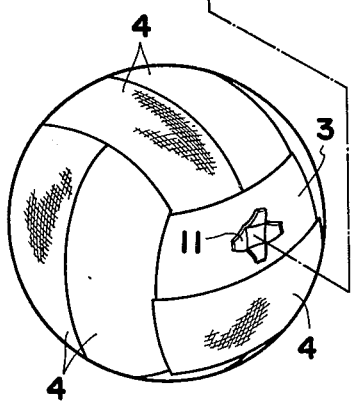
Figure 9:
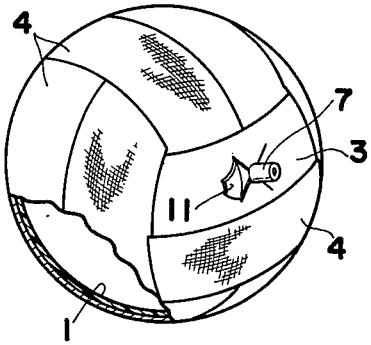

The cloth strip is then stuck at its turned-up edges 11 of the cut portion to the base of the tube valve 7 (FIG. 9).

Figure 10:
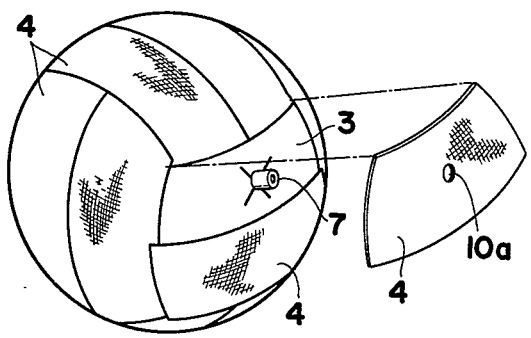

Another cloth strip 4 having an aperture 10b is stuck on the single cloth portion (FIG. 10). As a result, the bag body is entirely constructed of the first and second layers of the cloth strips 3 and 4 (FIG. 11).

The lubricant 2 on the tube 1 serves the purpose of isolating it from the inner surface of the bag body even in the condition that the tube 1 is fully pumped up through the valve 7 to result in a pressure contact between the bag body and the tube 1.

It has been ascertained in our experiments that this allows a player to experience an extremely desirable feel in using the volleyball. Further, talc is considered most preferable as a material of lubricant 2 for the reason that talc is insoluble in water, alkali or acid so that the ball exhibits the characteristic of isolation as explained above soon after it dries out following being wet. In addition, the bag body is provided with the double layers of the cloth strips 3 and 4 on the entire surface thereof so that the mechanical strength of the ball becomes higher to result in no possibility of tearing-up of the ball in practical use.

Figure 11:
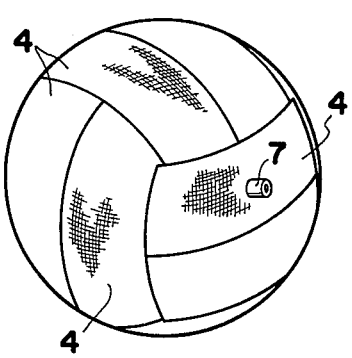

Next, the tube 1 is pumped up for the inflation thereof so that the bag body is expanded to provide a spherical shape (FIG. 11).

Figure 12:
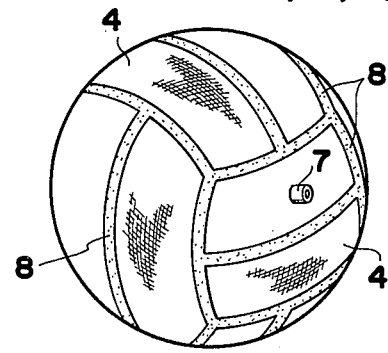
Figure 13:
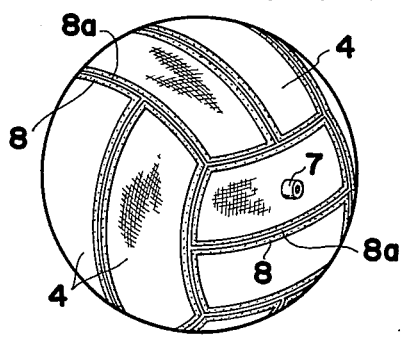

The expanded bag body is put into a mold for drawing lines which are approximately positioned on the center of the overlapping portions of the neighboring cloth strips. Thereafter, rubber ribbons 8 are stuck on the drawn lines of the bag body (FIG. 12). The bag body is then put into a vulcanizing mold which is of a spherical interior configuration of a predetermined diameter. The bag body is pumped up in the vulcanizing mold to make an intimate contact with the inner surface thereof. In this vulcanizing mold, the rubber ribbons 8 are heated to be cured on the bag body. The vulcanizing mold is provided with shallow grooves at the portions which correspond to boundaries of the leather sheets of an outer layer 5. Consequently, a plurality of low protrusions 8a are formed on the outer surface of the rubber ribbons 8 after the heat-curing (FIG. 13).

Figure 14:
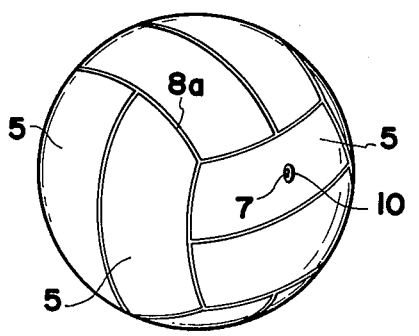

Finally, twelve leather sheets each of a four-sided polygonal shape as shown in FIG. 14 at 5 are stuck on the outer surface of the bag body along the low protrusions 8a of the rubber ribbons 8. In this case, the low protrusions 8a serve the purpose of providing a guide in the operation of sticking the leather sheets of the outer layer 5 on the bag body. The leather sheets 5 are then heated up to 60°-70° C. and pressed from the outside thereof to provide a complete volleyball (FIG. 14). It should be noted that one of the twelve leather sheets is provided with an opening 10 in which the valve 7 of the tube 1 is positioned to allow the pumping-up of the volleyball.

In the construction of a volleyball manufactured in a method of manufacturing a ball according to the present invention, the boundaries of the leather sheets of the outer layer 5 are defined on the rubber ribbons 8, that is, four-fold overlapping portions of the first and second layers of the four-fold cloth strips 3 and 4 so that these portions provide a great mechanical strength to avoid the tearing-up of a ball in practical use.

According to the present invention, there is provided a bag body of a substantially spherical configuration in its expanded condition only if a spherical hollow body is manufactured as having a substantially spherical configuration.

Accordingly, a ball such as volleyball or soccer ball is manufactured having a spherical configuration due to the manufacturing operation that leather sheets for an outer layer are stuck on the outer surface of the bag body. A spherical ball bounds so precisely that a player can toss or kick it at will in the game of volleyball or soccer.

Further, a player experiences desirable feel in using a ball manufactured in the present invention for the reason that the tube 1 does not adhere to the inner surface of a bag body due to the presence of lubricant-like talc therebetween even though they make an intimate contact with each other in a case where the tube is pumped up for practical use. In this case, it should be understood that the deformation of an outer layer and the bag body does not work to directly compress air in the tube at the instant when a player hits or receives the ball. More particularly, the above mentioned deformation is first replaced by that of the tube 1. Subsequently, the tube deformation works to compress air in the tube. That is, the tube 1 serves the purpose of functioning as a buffering material when using the ball.

There will now be obvious to those skilled in the art many modifications and variations of the above described embodiment. These modifications and variations will not depart from the scope of the invention if defined by the following claims.

What I claim is:

1. A method of manufacturing a ball, comprising:
   manufacturing a spherical hollow body of a brittle frangible material;
   adhering a first number N of four-sided polygonal-shaped cloth strips on said spherical hollow body in such a manner that the cloth strips overlap at the margins thereof to provide a first layer of a bag body;
   adhering a second number N-1 of four-sided polygonal-shaped cloth strips on said bag body in overlying relation with respective ones of said cloth strips of said first layer to form a second layer of said bag body, with said second cloth strips overlapping each other at the margins thereof at the overlaps of the margins of said first cloth strips, such that all but one of said first cloth strips is covered by a respective second cloth strip;
   collapsing said brittle spherical hollow body into pieces within said bag body, and thereafter cutting an opening through said still uncovered one of said cloth strips of said first layer of said bag body;
   taking the collapsed pieces of said spherical hollow body out of said bag body through said opening;
   providing a tube inflatable to a round configuration and having a valve for such inflating;
   coating the exterior of said tube with a lubricant;
   inserting said tube in a folded condition through said opening into said bag body such that said valve protrudes out of said bag body through said opening;
   adhering the turned-up edges of said opening to the base of said tube valve;
   providing another four-sided polygonal-shaped second cloth strip with an aperture and adhering said another second cloth strip in overlying relation on said uncovered one of said first cloth strips with said valve extending out through said aperture and the portion of said another second cloth strip surrounding said aperture overlying said edges of said opening in said one of said first cloth strips, to complete said second layer of cloth strips with said tube inside said bag body;

inflating said tube to provide an interior support for said bag body to thereby maintain the bag body with a spherical shape while maintaining a lubricated contact between the inflated tube and the bag body;

adhering thin, narrow, rubber ribbons atop the overlapping margins of said second cloth strips of said bag body while leaving a portion of each of said second cloth strips exposed between the surrounding ribbons;

forming low outwardly-projecting protrusions on and extending longitudinally along said ribbons;

sizing four-sided polygonal leather sheets to fit snugly upon the respective second cloth layer areas bounded by said low protrusions; and adhering said sized leather sheets to respective ones of said second cloth strips while using said protrusions to help guide the edges of said leather sheets into position on said bag body so that said sized leather sheets are snugly bounded by said protrusions.

2. A method of manufacturing a ball, comprising:

manufacturing a spherical hollow body of a fracturable material;

adhering a number of first cloth strips on said spherical hollow body in such a manner that the first cloth strips overlap at the margins thereof to provide a first layer of a substantially spherical bag body;

adhering a number of second substantially four-sided polygonal-shaped cloth strips on said bag body in overlying relation with said first layer to form a second layer of said bag body which substantially totally covers and surrounds said first layer except for at least a portion of one of said first cloth strips being uncovered, said second cloth strips overlapping each other at the margins thereof;

breaking said fracturable spherical hollow body into pieces within said bag body;

removing the fractured pieces of said spherical hollow body from the said bag body through an opening formed in the uncovered portion of said one first cloth strip;

providing a tube inflatable to a ball-like configuration and having a valve for such inflating;

coating the exterior of said tube with a dry lubricant;

inserting said tube in a folded condition through said opening into said bag body such that said valve protrudes out of said bag body through said opening;

providing a further second substantially four-sided polygonal cloth strip with an aperture therethrough and adhering said further second cloth strip in overlying relation on the uncovered portion of said one first cloth strip with said valve extending out through said aperture so as to complete said second layer of cloth strips with said tube being confined inside said bag body;

inflating said tube to provide an interior support for said bag body to maintain it with a spherical shape while maintaining a lubricated contact between the inflated tube and the bag body;

adhering thin elastomeric ribbons atop the overlapping margins of said second cloth strips of said bag body while leaving a portion of each of said second cloth strips exposed between the surrounding ribbons;

providing low outwardly-projecting protrusions on and extending longitudinally along said ribbons;

sizing four-sided polygonal-shaped outer covering sheets to fit snugly upon the respective second cloth layer areas bounded by said low protrusions; and adhering said sized outer covering sheets to respective ones of said second cloth strips while using said protrusions to help guide the edges of said sized outer covering sheets into position on said bag body so that said sized outer covering sheets are snugly bounded by said protrusions.

3. A method according to claim 2, including the steps of:

providing a vulcanizing mold with a spherical interior cavity having shallow grooves there around at positions corresponding to the boundaries of the covering sheets;

positioning said bag body, with the ribbons adhered thereon, within the cavity of said vulcanizing mold;

inflating the tube within said bag body so that the bag body makes intimate contact with the inner surface of the mold; and heat curing the ribbons within the mold for causing the material of the ribbons to flow into the grooves so as to form said protrusions.

4. A method according to claim 1, including the steps of:

providing a vulcanizing mold with a spherical interior cavity having shallow grooves therearound at positions corresponding to the boundaries of the leather sheets;

positioning said bag body, with the ribbons adhered thereon, within the cavity of said vulcanizing mold;

inflating the tube within said bag body so that the bag body makes intimate contact with the inner surface of the mold; and heat curing the ribbons within the mold for causing the material of the ribbons to flow into the grooves so as to form said protrusions.

* * * * *